Dec. 11, 1951    M. F. HILL ET AL    2,578,187
METHOD OF MAKING ROTORS
Filed June 25, 1946    5 Sheets-Sheet 1
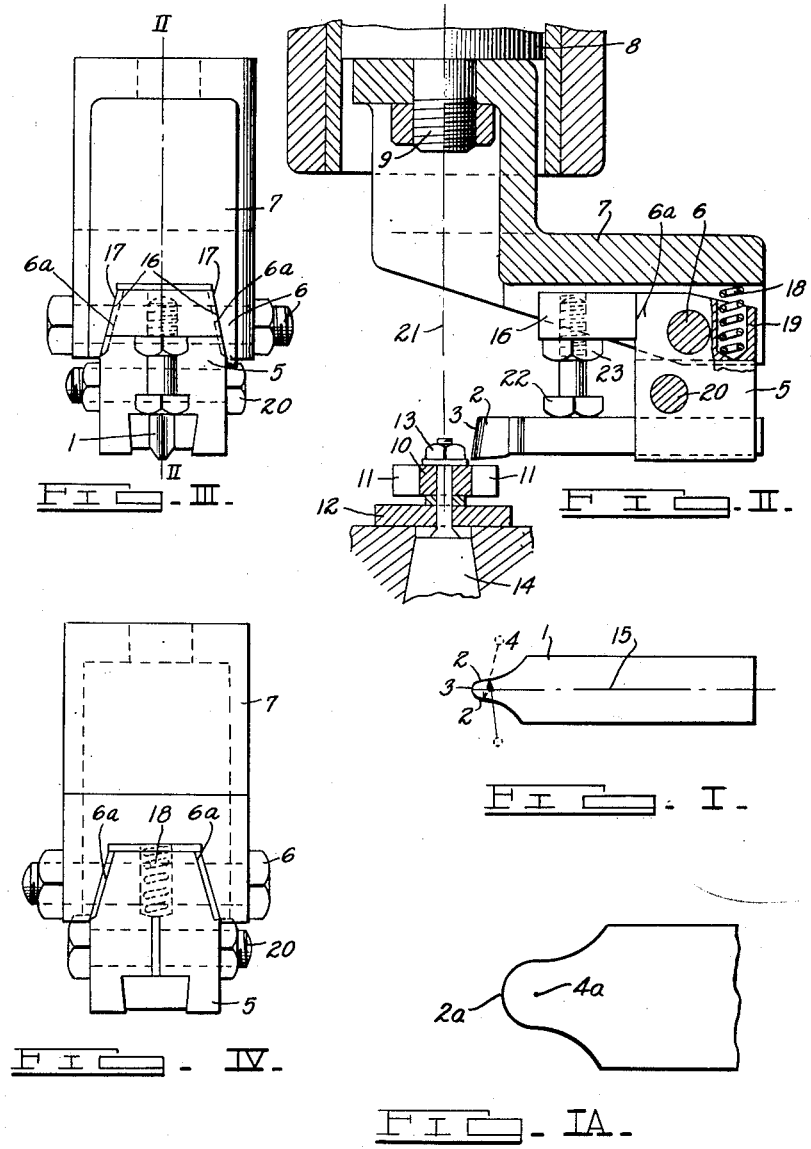
INVENTORS.
Myron Francis Hill
Francis A. Hill 2nd
BY Myron Francis Hill
ATTORNEY.

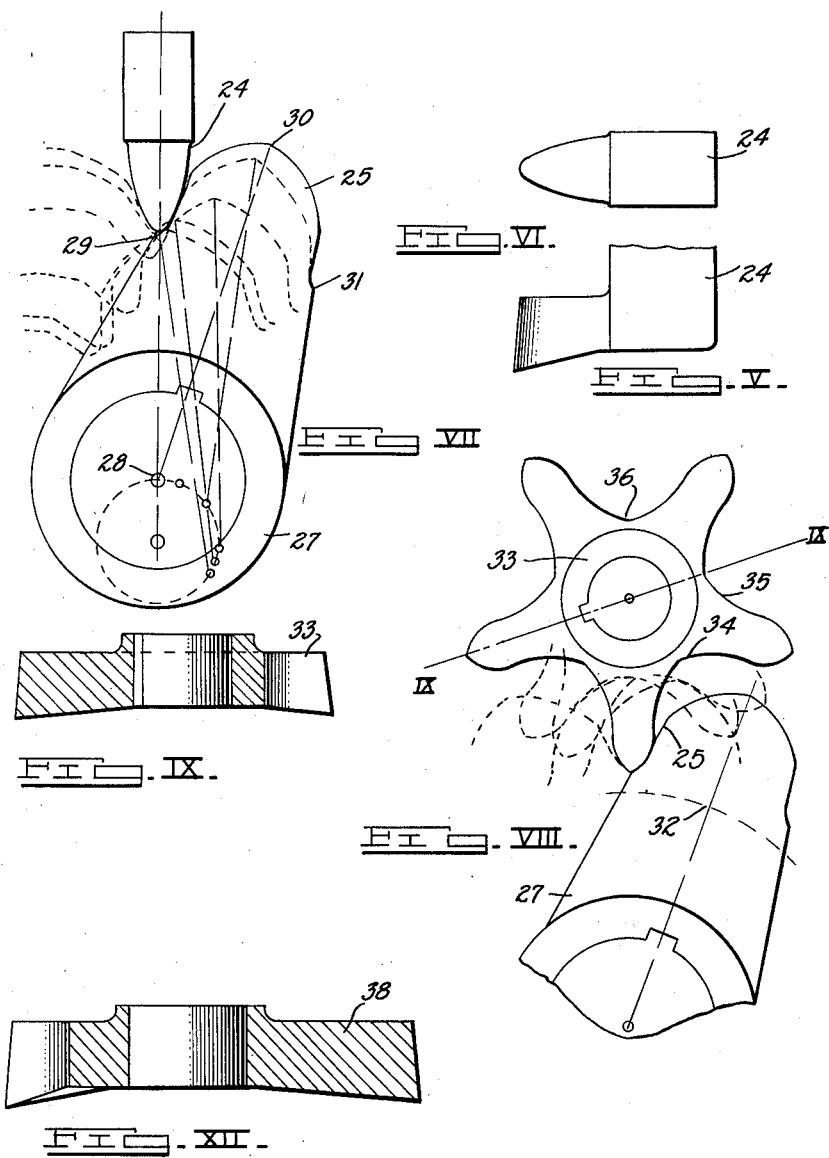

Dec. 11, 1951　　M. F. HILL ET AL　　2,578,187
METHOD OF MAKING ROTORS
Filed June 25, 1946　　　　　　　　　　5 Sheets-Sheet 3
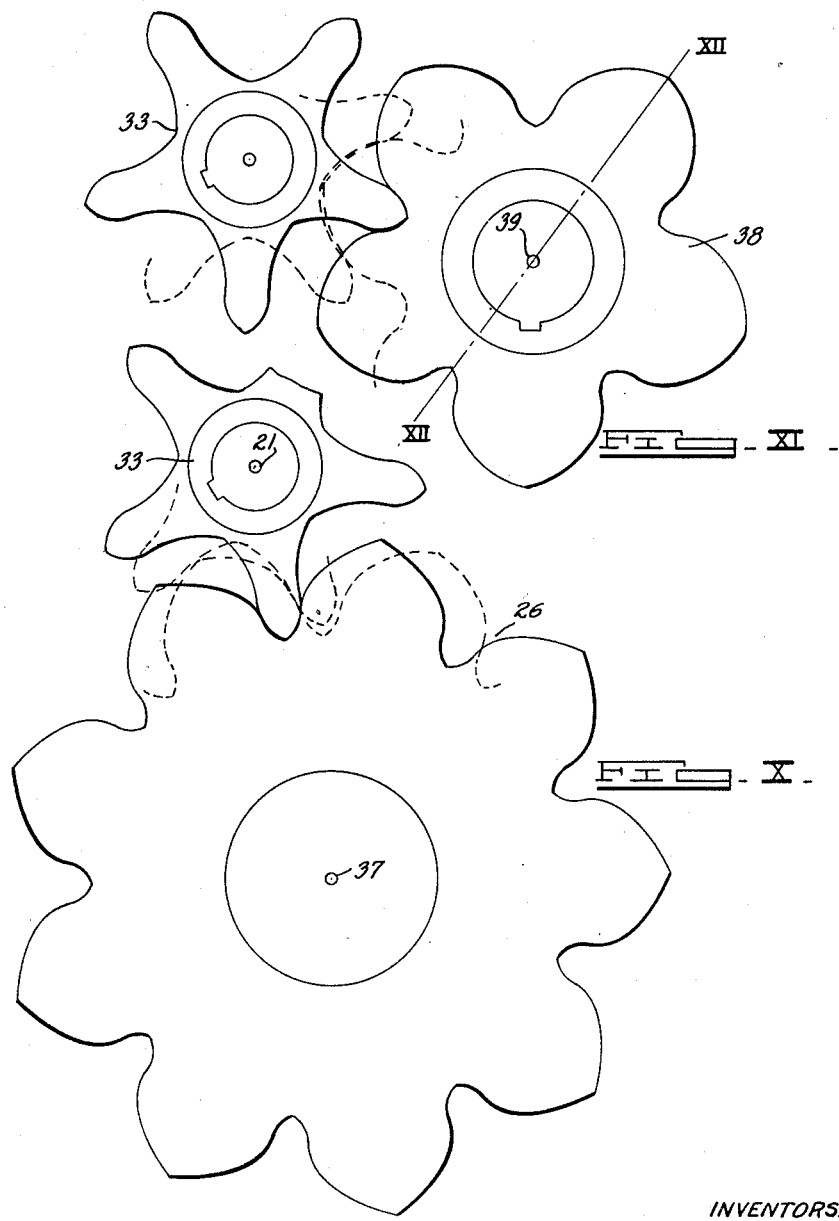
INVENTORS.
Myron Francis Hill
Francis A. Hill 2nd
BY Myron Francis Hill
ATTORNEY.

Dec. 11, 1951     M. F. HILL ET AL     2,578,187
METHOD OF MAKING ROTORS
Filed June 25, 1946     5 Sheets-Sheet 4
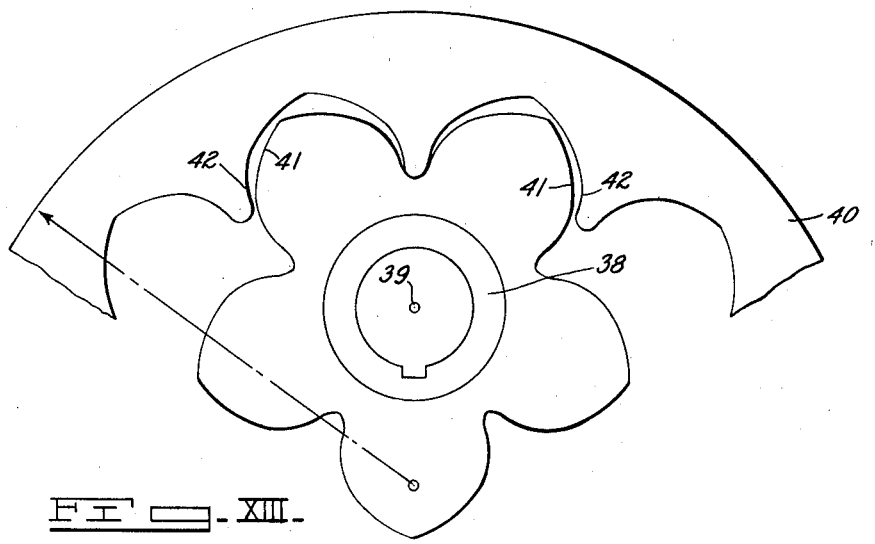
FIG. XIII.
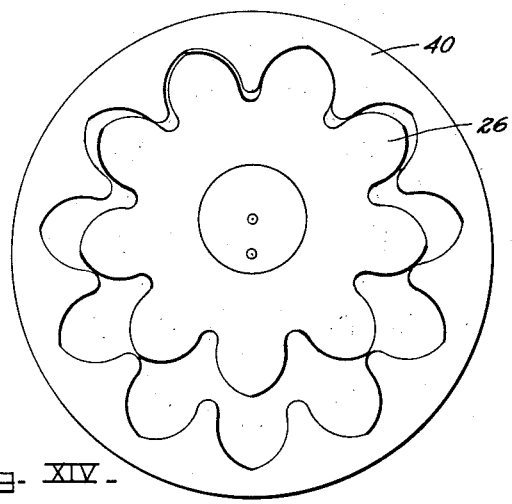
FIG. XIV.
INVENTORS.
Myron Francis Hill
Francis A. Hill 2nd
BY Myron Francis Hill
ATTORNEY.

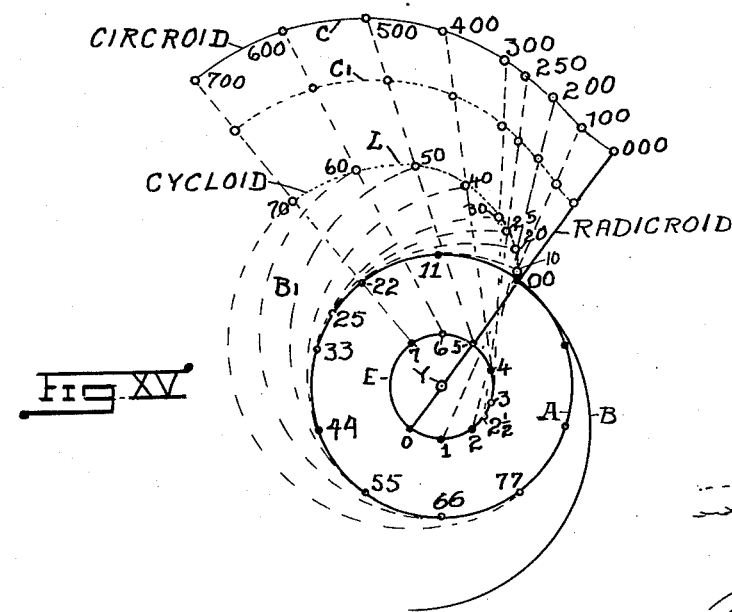
Fig. XV
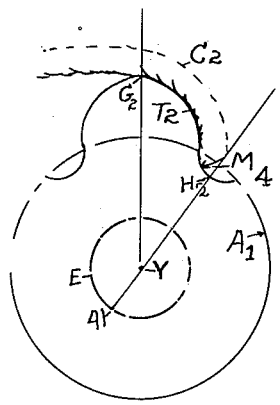
Fig. XVIII
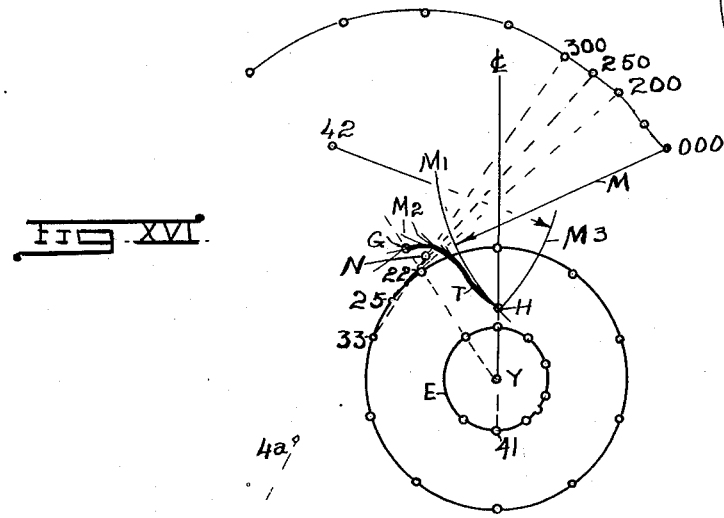
Fig. XVI
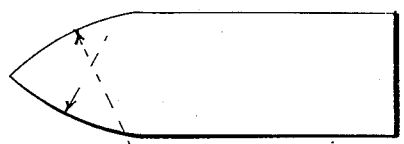
Fig. XVII
INVENTORS
MYRON F. HILL
FRANCIS. A. HILL, 2d
*Myron F. Hill*
ATT'Y Patented Dec. 11, 1951

2,578,187

UNITED STATES PATENT OFFICE 2,578,187

METHOD OF MAKING ROTORS

Myron Francis Hill and Francis A. Hill, 2nd, Westport, Conn.

Application June 25, 1946, Serial No. 679,253

7 Claims. (Cl. 90—3)

This application is a continuation-in-part of our application Serial No. 499,423, filed August 20, 1943, and now abandoned.

Our invention relates to an improvement in methods of manufacture and tool equipments for manufacturing rotors, suitable also for use with certain types of gearing having similar tooth relations.

The method of forming gears or rotors one within another and having one less tooth was disclosed in Patent No. 1,833,993 to M. F. Hill, one of these applicants.

When this patent was applied for it was believed that continuous contacts at ratio speeds between internal rotors having a difference of more than one tooth was impossible. In those rotors each tooth of one rotor travelled over one tooth of the other and in continuous contact with it, during the whole rotation. If the numbers of teeth were more than one, how could this continuous contact be possible when a tooth was jumped over? This might appear to destroy continuous contact and that continuous contact must depend on a difference of one tooth.

Then it was discovered upon inspection of Fig. IX of Reissue Patent 21,316, to M. F. Hill, showing internal rotors having a tooth difference of one, that an extra tooth might be mounted in the middle of each pinion tooth space and a corresponding tooth space cut in the middle of each outer rotor tooth, thus doubling the number of teeth, and providing in effect two pairs of rotors combined in one, having a difference of two teeth. Each set was generated by the original processes set forth in prior Hill patents, the blank after generating one set of teeth being indexed for the other set of teeth. Patent No. 2,091,317 issued upon this idea.

This system lost the "hunting relation" of the original rotors by which each tooth of one rotor engaged all the teeth of the other rotor in turning.

In Patent 2,091,317 generation of a rotor required two stages. A tool during generation skipped each alternate tooth space, and then after indexing the blank half a tooth, the process was repeated on the skipped over tooth spaces to complete the rotor. This indexing made evenly spaced teeth almost impossible, destroying continuous contacts on half of the teeth.

We have found, as a result of our geometric analysis, that rotors with even numbers of teeth may have such numbers altered by adding or subtracting one from each number, and thus provide the hunting relation between each tooth of one rotor and all the teeth of the other rotor.

In running, a tooth of gears or rotors having a tooth ratio of 6 to 8 (twice 3 to 4) with their numbers of teeth having a common denominator, a tooth of one rotor can engage alternate teeth of the other, but can never engage the intermediate teeth of the other. A second tooth of the one rotor engages only the intermediate teeth of the other rotor. A complete hunting relation was absent. This is inherent in the tooth ratio in which the numbers of teeth of both rotors are divisible by more than one.

By adding one tooth to each rotor, the ratio is changed to 7 to 9. By subtracting one tooth from each, the ratio of teeth is changed to 5 to 7. Both of these odd ratios, having no common denominator, have a new relation in running such that a given tooth of one rotor during revolution engages only alternate teeth of the other rotor, and then during a second revolution, engages the intermediate teeth of the other rotor, thus generating all the teeth at one setting, the only commercially practicable way of machining accurately indexed rotors known.

In generating gear teeth in a generating machine, skipping tooth spaces is common. It depends on the tooth ratio. But contiguous tooth engagement has been absent. A graph of tooth pressures proved it. They have no circroidal addition. Gerotor teeth, having spur teeth differing by 1 with the circroidal addition (see Patent (reissue) 21,316) do maintain a steady continuous contact. In all ratios of numbers differing by more than one, of which the numbers have no common denominator, each tooth of a rotor engages in its proper turn, all the teeth of the other rotor. Hence a tool which represents a tooth of one rotor may form all the teeth of the other rotor.

In rotors having a difference of more than one tooth with no common denominator, generation by a tool representing a tooth of one rotor means forming alternate teeth or tooth spaces on the other rotor during a first revolution and then forming intermediate teeth or tooth spaces during one or more following revolutions. It provides the commercially practicable and inexpensive method of forming accurately indexed tooth contours.

The speeds of rotors are inverse to their numbers of teeth. In 5 to 7 toothed rotors, for example, the larger rotor runs more slowly than the smaller. Instead of relative speeds of 7 to 5 they run at the inverse of 7 to 5 which is 5 to 7.

From the foregoing, it follows that while a Fellows or other gear generator for rotors having such tooth ratios as 3 to 4, 4 to 5, 6 to 7, etc., successive teeth are generated in series, one next to the other, by cutting tooth spaces between them correspondingly; with double the numbers of teeth, a tool representing but one tooth could generate only one half of the teeth of the blank, skipping every other tooth. Then the blank must be indexed to cut the remaining intermediate ones. As an illustration, a tooth ratio of 3 to 4, differing by one, to start with, with teeth doubled gives a ratio of 6 to 8. It has a common denominator of 2. One set of teeth is generated, then after indexing, the other set is generated. Adding 1 to each of the 6 and 8 figures provides a ratio of 7 to 9. These numbers have no common denominator and all the teeth of each rotor can therefore be generated by a tool representing one tooth of the other rotor. (One of the numbers is a prime number.)

Subtracting one from each of the 6 to 8 ratio numbers gives 5 to 7, which also have no common denominator. Both numbers are prime. Each tooth of one rotor engages each tooth of the other rotor, skipping a tooth as it passes from one to another.

Starting with a 4 to 5 ratio, doubling gives 8 to 10, both divisible by 2, and requiring two generating operations. Adding 1 gives 9 to 11, and subtracting 1 gives 7 to 9, neither ratio having a common denominator, so that all such teeth of a rotor may be generated at one setting by a tool representing a tooth of the other rotor. Another illustration is trebling a ratio instead of doubling it. Trebling a 3 to 4 ratio gives 9 to 12 teeth both numbers divisible by 3. Three different generating operations are required. Adding 1 to 9 by 12 gives 10 to 13 and subtracting 1 gives 8 to 11, both ratios having no common denominator and having a difference of three teeth. (Generation is at one setting.) A difference of two teeth has greater displacement, while a difference of three teeth has a lesser displacement, than a difference of one tooth, under otherwise even conditions.

Our invention comprises also the adaptation of a selected master generating form, and its determination of the characteristics of the other factors of the tool equipment. An initial convex form is preferable but not the only form possible. For example a concave initial form might be used.

This initial form may be used in different ways. One way is to mount it in a device or holder fitted to a modified Fellows gear shaper by means of which it may generate entire pinion contours; or it may generate a tooth division pinion curve on a mated form tool. Then these two forms—the initial generating form and the mated form—may be employed, as upon the geared members of a Fellows gear shaper (with backing off mechanism removed) to generate manufacturing tools suitable for rapid cutting or grinding of pinion and annular rotors, one such tool being adapted to the pinion and the other tool adapted to the annular rotor. It is also true that these two formed cutting or grinding tools are complements of each other, it being possible to generate either one from the other.

The manufacture of large sizes of rotors heretofore has been deterred by requirements of building special, heavy, and expensive machinery before a single accurate pair of large rotors could be produced. So that when it is desired to manufacture rotors so large as to be beyond the reach of a Fellows gear shaper equipped with our tool holder, we employ, instead, as a first step, the generating master form tool mounted in a vertical slotting machine having a table movable at right angles and circularly, with micrometer feeds. This generated master form may be mounted on the ram and the work or blank for the mating master tool mounted upon the bed. Between cuts the bed is slightly moved circularly and at right angles so that the master generating tool after very many cuts forms a curve upon the blank corresponding to the pinion curves of a pair of rotors, of which the outer rotor has convex tooth portions corresponding to the form of the master generating tool. By this means the rest of the process becomes possible on a modified Fellows gear shaper and the cutting edge of the tool may be close to the axis of the ram regardless of the size of the rotors, thus making possible, without high cost of special machinery, rotors having many times the diameter of rotors heretofore possible.

In the drawings:

Figure I shows in plan view one form of a generating tool.

Figure Ia shows a variation.

Figure II shows a "clapper" tool fixture whose main body is in section on line II—II Figure III, and the clapper part in side elevation.

Figure III is a front elevation of Figure II from the left.

Figure IV is a rear elevation, from the right of Fig. II.

Figure V shows a form tool for large size work.

Figure VI is a plan view of the tool in Figure V.

Figure VII shows how it is enabled to cut a pinion tooth division while mounted in a vertical slotting machine.

Figure VIII shows how the mated tool in Figure VII may be used to generate a pinion cutter.

Figure IX shows a section of the pinion cutter on line IX—IX in Figure VIII.

Figure X shows how the pinion cutter may be employed to generate a complete pinion in a Fellows gear shaper.

Figure XI shows how the pinion cutter may generate an annular rotor cutter in a Fellows gear shaper.

Figure XII is a section of an annular rotor cutter on line XII—XII Figure XI.

Figure XIII shows how an annular rotor cutter generates an annular contour in a Fellows gear shaper.

Figure XIV illustrates the assembly of the rotors so manufactured.

Figure XV shows a geometrical diagram to enable one to determine rotor contours and their limiting factors.

Figure XVI shows the use of this diagram in determining a pinion contour from a given outer rotor tooth curve.

Figure XVII shows part of a diagram for the type of rotor curves in Figures XI and XIV.

Figure XVIII shows a generating tool having the contour of a tooth of a master convex rotor.

In the drawings the actual generated curves are impossible to be shown with exactness since the lines themselves have to be sufficiently wide to be seen and thus can not define that close contact between rotor curves which this invention aims to accomplish. In drafting these lines one may only approximate the actual curves.

In Figure I is illustrated a form of a generating tool 1, its sides having circular curves 2, the radius of one centered at 4, the other symmetrical with it and joined together by some line, preferably by a rounded or circular curve 3 of a size and shape suitable for our method. The radius from the center 4 of a curve 2, if it is circular, passes thru the center of a radius of curve 3, thus providing a rounded nose tool.

In other Hill patents, as for example Reissue No. 21,316 to M. F. Hill, the circroidal addition has been described as the controlling factor in the location and design of these rotor curves. The circroidal addition, as fully explained later on, relates to the distance at which the center of the generating curve must lie from the center of the rotor to be generated to avoid undercutting the generated curves. The circroidal addition relation must be observed in the design of this tool in order to fit it to the work intended. When a curve 3 of smaller radius than that of the generating curve 2 is used it cannot undercut curves generated by the form curve 2 since the curve 2, with its radius of curvature and its length, requires a greater circroidal addition than the curve 3. Another form may be that in Figure Ia in which side curves may be convex. Circular curves are easiest to handle. They are centered at 4a, and are preferably symmetrical.

This tool 1 is mounted in a so-called "clapper" 5 which is hinged upon a bolt 6 in the "box" 7 which in turn is secured to the ram 8 of a Fellows gear shaper by means of the stud and nut 9. The cutting edges 2 and 3 of the tool 1 are adapted to cut upon the blank 10, teeth 11 which may be pinion teeth of a pair of rotors; or may be cutting teeth of a tool which may generate a larger annular rotor and also generate a cutting tool for a corresponding pinion. This blank 10 is mounted upon the usual base 12 and secured by the bolt 13 and tapered member 14, according to Fellows gear shaper practice. When this clapper tool is employed in a Fellows gear shaper, the customary backing off mechanism is disconnected. And instead of a gear form of cutter with many teeth, we usually employ a single tooth cutter, particularly for tool forming. The object of removing the backing off mechanism is to avoid dragging on the up stroke. If not disconnected this backing off of the work in our method would cause the tool 1 to dig into the blank while travelling around its opposite side because a cutting tool has to be maintained, during rotation, on the rotor axis, its feed to start from a point between that axis and its final or rotor tooth position. On the up stroke of the ram, the clapper permits the tool to swing away from its cutting position. This occurs after every cutting or forming stroke around the blank. This up and down motion of the tool 1 in its holder may be very slight if the clapper is given lateral freedom to prevent the side curves of the tool from dragging. This is accomplished by providing lateral looseness between the side walls where the clapper is mounted on the bolt 6. This would be destructive of accuracy in cutting the blank 10 were it not for the fact that the clapper 5 is provided with beveled positioning sides 16 fitting the beveled surfaces 17 in the box 7. These bevels are inclined at such an angle that the clapper will not wedge in the box 7 but is held in an exact position for cutting the blank. This engagement 16 and 17 at the end of the up stroke is effected by means of the spring 18 in the hole 19 in the clapper and butting against the box 7 at the top of the spring. This spring should be sufficiently strong to bring both surfaces 16 into engagement with both surfaces 17 before the tool begins to cut.

In Figure IV is shown how the tool 1 is dovetailed into the clapper 5 and held securely by the bolt 20. The clapper in Figure II is adapted to hold tool cutters 1 of various lengths for cutting different diameters of blanks 10 and also to allow the axis of the blank 10 to be shifted further and further away from the axis 21 of the ram for making cutters in accordance with description given below; that is, on pitch circles other than that of the pinion.

For a tool like that shown, a supporting bolt 22 in clapper 5 is employed, secured in the proper position by the nut 23. Shorter tools would not require this bolt.

The blank 10 in Figure II has its axis at a distance from the axis 21 equal to the eccentricity of a pair of rotors, of which the blank 10 may be the pinion. When the blank is intended to be a cutting tool having a smaller pitch circle and a lesser number of teeth than the pinion it may become the cutter for the annular rotor in which case its axis is moved a sufficient distance from the axis 21 in accordance with description outlined below, it being understood that the pitch circle of the blank becomes tangent to the pitch circle of the annular rotor having the form of teeth like that of the tool 1. The rest of the method of making generative rotors may be the same as for the larger sizes described below.

The size of rotors which can be manufactured by this clapper tool is limited. For when the cutter surfaces 2 and 3 are shifted too far from the axis 21 of the Fellows gear shaper (or any other similar machine) accuracy of cutting is lost. For larger rotor sizes, therefore, a modification of this system has been found advisable.

In Figures V and VI is shown in full size a cutter 24 for generating the contours of a pinion of the size shown in Figure X, shown also on a reduced scale in Figure XIV. This tool may have the combination of curves in Figure I but of a larger size and the relative form and size shown will do the work described. It is caused first to cut a mating form tool 25 corresponding with the contour of a tooth division of the aforesaid pinion 26 in Figure X. The tool 24 is mounted on the ram in the slotting machine which reciprocates up and down, but does not otherwise rotate or shift its position in any way. A tool steel blank 27 has a hole by means of which it may be mounted on a bed of the slotting machine in a fixed position. This bed rotates upon an axis 28. The bed is mounted upon two traverse members operated at right angles to each other. By means of these three motions the blank is caused to assume with relation to the tool 24 all the positions that the contours 26 in Figure X would assume if rotating with relation to a tooth of a mating annular rotor when the annular rotor is fixed and the pinion is rolled around in it. Computations may be made of the amount of traverse for each of the traversing members for any given angular rotation of the bed to provide the proper coordinate X and Y values for the pinion axis 28 of the tool. After each shift the tool 24 is caused to make a cut and if the angular shift and the degree of the traverses is sufficiently small, a substantially smooth contour will be provided. Fifty different cutting positions of the blank will provide a smooth curve from the bottom of the curve 29 to the top 30, after which the process should be reversed starting at 31 and cutting the curve from 31 to 30. In this way the effect of backlash in the slotting machine is eliminated and the two sides of the tool curve are symmetrical.

It is now possible to generate a cutting tool for the pinion by the process illustrated in Figure VIII. It is preferable to provide the top of the tool curve 25 with the cutting edge and mount it upon the bed of a Fellows gear shaper, well supported upon the lower side as far out from the center as possible without interfering with the cuts. A blank 33 is then mounted upon a ram and may then be generated by a Fellows gear shaper cutting upward on the descending blank instead of a downward cut.

The gearing should be such as to cause the blank for the teeth of the pinion and the tool which represents a tooth portion of the outer rotor to rotate at the relative speeds of the rotors themselves. During the process of generation of the tool 33 this mating tool, rotating clockwise, first generates a space 34 in the cutting tool a single whole tooth division from the top of a tooth to the bottom of a space and to the top of the next tooth, and then is idling over the next tooth division space, until it arrives at another tooth division 35 in the tool 33. The next tooth division to be cut is 36 and then the other tooth spaces in similar alternate succession, completing the cutter contour. After this contour is finished the tool may be finished in the usual manner to give it proper clearance for cutting and resharpening without changing its form. This cutting tool 33 may be used next in a Fellows gear shaper to cut the contour 26 as indicated in Figure X. It is understood that the ram and bed of the Fellows gear shaper are geared together at the proper ratios as determined by the numbers of teeth of the tool 33 and of the pinion 26.

It is quite evident that a cutter 33 having but one of the teeth shown or but one tooth space, will cut all of the tooth divisions of a complete pinion; or the cutting tool may have two or three or four of the five teeth and still cut all the pinion teeth. Again it is not necessary that the cutter has a ratio circle for five teeth. It may have ratio circles for four, or seven or two, in fact any number where the form may be generated by the tooth form of the pinion, it being understood that as regards this particular variation in the numbers of the teeth of the tool, it should have the same proportionate relation to the pitch circle of the pinion that the numbers of teeth of the tool have to the numbers of teeth of the pinion. The Fellows gear shaper employs gears between the ram and bed to rotate them at the right speeds. A three or a six tooth tool might be used to cut the nine tooth pinion, but since these numbers of teeth have a common denominator each tooth of the cutting tool will not have a cutting relation to each tooth of the pinion and the tool might not be so advantageous as when each tooth of the cutting tool is ever engaging in proper sequence all the different tooth divisions of the pinion, thus having a "hunting" relation. It will be noted that in the generation just described the backing-off mechanism of the Fellows gear shaper may perform its customary function. The cutting tool is mounted directly on the ram, of course. It will be noted that the cutting curves of the cutting tool are close to the axis 21 of the ram of the Fellows gear shaper and hence well supported, and the pinion blank having the teeth 26 may be supported up to within an eighth of an inch or less of the teeth 26 giving them a very solid support for the cutting action even tho at a considerable distance from the center 37 in Figure X which is the center of the bed of the Fellows gear shaper. In fact the distance from the center 37 of the cut is immaterial so long as it is within the limits of the gear shaper machine being used.

While we have shown this system as applied to a Fellows gear shaper, it is merely mentioned because it is a well known and popular machine. Any other machine having similar generating characteristics will do. Grinding wheels usually give more accurate results than cutters.

The next step is to make a cutter for generating the annular rotor upon a gear shaper. For small sizes this may be done by generating a tool 38 (Figure XI) by means of the clapper tool shown in Figures II, III, and IV using a cutting tool similar to 1 but having, for rotors of the size under consideration, cutting contours of the tool 24 in Figure VI. The tool blank is pushed out further to allow for the tool 38 to be located for proper generation. After such a tool is generated it may be employed to generate an outer rotor as illustrated in Figure XIII. For large size rotors, however, the cutting portions of the tool in the clapper are too far from the axis 21 of the ram for accurate generation. In this case the tool 38 may be generated by the tool 33 as illustrated in Figure XI. The tool 33 may be varied for the purposes of cutting the tool 38 as it may be varied for cutting the pinion 26. In fact the larger the pair of rotors the less the numbers of teeth and the smaller the pitch circle should be of the tool 38. Too many teeth on the tool 38 while generating an annular rotor 40 in Figure XIII might cause the portions of the curves 41 of the cutter to interfere with the curves of the annular rotor during the backing off of the tool in which case the numbers of teeth on the cutter should be so reduced as to avoid interference. Conditions might occur in designing rotors where a five tooth cutter might have such interference, in which case a four tooth cutter might have the necessary clearance, or even a lesser number of teeth.

In cases where the annular rotor is near the maximum limits of a given gear shaper and the cutting curves of the cutter are too far from the curves 39 for satisfactory generation, the numbers of teeth on the cutter may be reduced to bring the cutting curves nearer to the axis 39. If reduction in numbers of teeth of the cutter is continued too far, generative relation between cutter and rotor will be lost.

Figure XIV shows a pair of rotors manufactured by this method on a scale about half of that in Figures X and XI.

While we have discussed this invention with relation to rotors having numbers of teeth having ratios of 5 to 7 and 9 to 11, the same method may be used for rotors having a greater or a lesser number of teeth ever having a difference in numbers of teeth more than one. Nor it is limited to the forms of tools shown or to rotors having odd numbers of teeth or only a difference of two teeth. Nevertheless the increase in difference between the numbers of teeth as compared with the difference of one tooth in our earlier patent makes possible an efficient and economical manufacture from the point of view of tools as well as more rapid cutting of the rotors.

In generating a pair of rotors shown in the Hill Reissue Patent No. 21,316, having a difference of one tooth, due to the wide cut and heavy load on the tool, the slowest part of the operation was while generating middle portions of the tooth spaces. This wide cut necessitated a slow feed which slowed up the operation on the whole rotor.

The absence of that condition in these rotors and the very small length of cut by each portion of the cutting tool makes possible a fast generation of the rotors, reducing their costs correspondingly.

Figure XV shows a "lay-out" as a basis of drawing different circroids and corresponding rotor contours for comparison, to estimate their relative values. It comprises an outer ratio circle—or arcs of it—a pinion circle, a "radicroid," that is, a radius of the outer ratio circle, extended beyond the outer ratio circle a distance which may be varied according to choice, and positions along a cycloid which assist in locating the radicroid in successive rolling positions, that is, rolling of an outer ratio circle upon the pinion ratio circle. Figure XVI utilizes the pinion ratio circle and the circroid to explain the critical factor that determines the inner limits of the pinion contour, generated by a selected form fixed to the end of the radicroid. A circular form is usually employed, but other forms may be used or considered.

In Figure XV the pinion ratio circle A is divided into an equal number of arcs. Ten are convenient for a five tooth pinion, some of which are marked 00, 11, 22, 33, 44, 55, 66, and 77. An extra division between 22 and 33 assists accuracy for reasons to follow. It is marked 25. An eccentricity circle E is described from the center of A, marked Y, having a radius equal to the eccentricity of the proposed rotor curve. This circle is also divided into ten parts, at 0, 1, 2, 3, 4, 5, 6, and 7, etc. The others are not used for the half tooth contours. The starting position of the radicroid is from the point 0 in E thru the point 00 in A, and on out to the point 000 selected as an experiment. The ratio circle of the outer rotor is not drawn in full to save unnecessary confusion, and is indicated by the arc B in the starting position. As the ratio circle rolls it assumes successive positions indicated in broken lines B1. As the ratio circle rolls, and assumes the various positions B1, etc., its point 00 travels thru the various points 10, 20, 25, 30, 40, 50, 60 and 70, which in reality are points in a cycloid, since a point of one circle rolling on another travels along a cycloid. Meanwhile, the center of ratio circle B, point 0 in the circle of eccentricity E, travels around this circle E thru the various points 1, 2, etc. As the radicroid R coincides with and includes the radius of B, and moves with it, its point 00 travels thru points 10, 20, etc., while tracing the cycloid L. The tip, 000 of the radicroid, out beyond the ratio circle, traces the curve, running thru the points 100, 200, 250, 300, 400, 500, 600, 700, etc.

The radicroid and its points 0, 00 and 000 travel thru other points between, some of which may be needed for accuracy. The curve C traced by the point 000 is a circroid wanted for trying out rotor curves. C1 is another circroid traced by the tip of a shorter radicroid.

Figure XVI shows this circroid C and the pinion ratio circle A with its above described dividing points. We seek a contour parallel to or equidistant from the circroid. The circular arc M1 centered upon and fixed to the tip of the radicroid, is to be used to describe this parallel curve, its envelope, from successive points along the circroid. The best length of its radius M has not yet been described. If it is too long, a critical portion of the envelope will be broken into parts crossing each other at different angles. There must be a critical point outside of which the perfect rotor tooth contour must lie. If the rotor tooth curve is parallel to the circroid all instant radii must be normal to tangents of both—and for an equidistant envelope all such normals must be of equal length.

If the curve M1 is a non-circular curve the envelope corresponds to its irregularity. In that direction lie complicated tooth forms with many circroidal additions varied to correspond, all lying within the field of our invention.

Circular tooth curves illustrate the principle involved to better advantage. They have radii normal to them. Radii normal to circroids are the instant lines from given points of the circroid to corresponding points on the ratio circle A to which the ratio circle B is tangent as it rolls on A. The end of the radicroid, while tracing the circroid, is swinging or turning on a travelling point—the point of tangency between the circles A and B. A few of these instant radii are indicated in Figure XVI, one from 200 to 22, and another from 300 to 33. They converge more and intersect nearer the circroid than lines from other points except a line from near 250 to 25 which intersects lines near 300 to 33, even nearer the circroid. The point of intersection between these various instant radii nearest to the circroid, is the critical point that we are after, since any envelope beyond the point is broken up by arcs lying at interfering angles. This point of intersection is indicated at N. Only an envelope between N and the circroid (radially outside of N) will provide a tooth curve having a continuous tooth contact relation with a tooth curve M1 of an outer rotor.

The distance of the tip of the radicroid to its ratio circle is termed the "circroidal addition," and with a given ratio, this circroidal addition determines the distance of "N" from it. Circular master forms have been described, but any tooth curve designed for rotors or gears having radii of curvature greater than zero at the ratio circle, must observe the requirement of the circroidal addition in order to maintain continuous tooth contacts and pressure holding engagements at ratio speeds.

It was believed that the nearer the tip of the radicroid is to its ratio circle, the more the radius M also has to be reduced. By such reductions the instant radii of the circroid are reduced. If this reduction is carried to its limit—zero—the circroid is merged into a cycloid such as L in XV, and the radius of M1 is correspondingly reduced. To put it another way, there is no envelope possible within a cycloid and equidistant from it. It is the failure of gear designers generally to understand this fact that is responsible for noisy gears and limited durabality.

One would naturally suppose that in order to generate a tooth of a rotor or gear, a blank would be located on the inner ratio circle axis, and a tool contour to generate with centered on the outer ratio circle radius, and that generation would produce continuous contact tooth curves. When this process failed, as it always must, to produce a smooth acting curve, it was a puzzle. It was believed that the generating tool certainly could not be carried on a greater radius than that of the ratio circle, because the speed ratio would be changed. That is where efforts to solve this rotary problem undoubtedly stopped. It is the illogical idea that solved the enigma. For while a master form is mounted on a radicroid of greater length than the radius of a ratio circle, nevertheless the resulting generated tooth contour may lie across the ratio circle as gear teeth should, and thus travel at the true speed ratio. It also might lie outside of the ratio circle but that location introduces angular slip and poorer pressure angles. Circular type rotor contours may have more than one circroidal addition if merged into each other. Contours once determined may be modified where not needed for engagements.

In order to locate as accurately as possible, the intersection "N" in Figure XVI, a large chart is used, and instruments of accuracy locate the various points involved. The relative location shown is approximate. A number of normals are drawn from points on the circroid between 200 and 300 to corresponding points upon the ratio circle A before the point N was finally located. Varying the ratio or circroidal addition shifts the point N. It must always be the intersection that is nearest to the circroid. For the relations shown in Figure XVI the intersecting normals or instant radii of the circroid are between the 200 and 300 positions. For other relations it is nearer the point 000 or further away from it. Some of the normals diverge and require no consideration. The intersection might be considered to be an apex of a triangle whose base is between the two points on the circroid at an infinitely small distance from each other, and sides converging at an infinitely small angle. While the diagram method is a shorter and easier one, differential equations may be used to find the mathematically correct N.

Practically, the tooth curve T is drawn as an envelope outlined by arcs having a radius of M and centered at successive points all along the circroid. The radius M must locate the envelope between the point N and the circroid. The nearer it is to the circroid, the more it partakes of its curvatures. The nearer it is to the point N the sharper the curvature around N. If carried to its limit, a corner around N is arrived at, apparently too sharp to be relied on. By having the curve located a slight distance from N the best results are attained. This provides a curve to replace the sharp corner.

Pressure angles are involved in the radius of the curve M1. The less the radius, the greater the variation in the pressure angles in the driving range. Pressure angles for a given ratio may be varied with the radius of curvature. The inclination of the curve is better with a larger radius, due to the curve centers being farther away around the ratio circle, as indicated in Figure XVI where 000 is far to the right of the vertical axis, while the tooth curve T is far to the left. The pressure angle is equal to that between a tangent to the driving curve at any point, and a radius of a ratio circle to that point. During a driving relation over a driving range of one tooth division, the tangent point is travelling, hence its angle varies. A fixed pressure angle bars continuous tooth contact in the driving range.

As the circroidal addition is reduced as described, the critical normal from the circroid to the ratio circle is ever shifting along the circroid towards 000. With changes in the numbers of teeth, and with variations of the other factors mentioned, the location of the normal also changes in one direction or another, and in designing different rotors, with different relative radii of curvature, these various changes are studied to select the forms most suitable for the rotors desired; compromising upon numbers of teeth, sizes of master curves, circroidal additions, for strength, low pressure angles, and displacement. By making graphs of the effect of the changes of each of the factors, one is enabled to select more intelligently the form best suited to the problem in hand.

In order to design rotors having other numbers of teeth, the ratio circles are altered to correspond. In 9 and 11 tooth rotors, for example, the ratio circle A of Figure XIV has a radius $4\frac{1}{2}$ times the eccentricity, and the ratio circle B has a radius $5\frac{1}{2}$ times the eccentricity. Circle A has a number of divisions laid off on it of equal length and the points of the cycloid L are located to accord with them. The rest of the procedure is similar to that for the 5 and 7 tooth rotors, except that the radius M and the circroidal addition have to be experimented with to get the best form of tooth curve, the best pressure angles, sufficient tooth size and greatest displacement for the different ratio. Such experimentation consists of varying the circroidal addition by varying the extension of the radicroid beyond its ratio circle, then finding the point N for such circroid as may be described by the radicroid, and then with a radius a little short of the point N, outlining a rotor tooth curve from successive points along the circroid.

After describing a curve that appears satisfactory for the tooth ratio, its driving relation, its displacement, its pressure angles, etc., the next step is to select the portion of such a tooth curve desired for a rotor tooth. In Figure XVI curves were sought for a five tooth pinion. The curve T may be one side of a tooth. Obviously half a tooth is limited to one-fifth of 360° divided by two, which is 36°. So next it is desired to find out what part of the curve T may be utilized for one half of the tooth. The radial lines GY and HY are drawn from the ratio circle center Y at this angle of 36° to each other. By swinging them around the center, back and forth, they include different portions of the curve T. The part included in this figure is from G to H. If swung to the right, the end H is nearer the center Y, and there is little change of diameter at G. This might be desirable as it increases displacement, but for many uses the shaft usable with this contour would be too small. Also the teeth might lack strength as being too thin. The teeth shown in Figures I, II and III show the final compromise between these factors.

The curve M3, the reverse of M1 from the point H, provides the other sides of the outer rotor teeth. This curve M3 springs from the point H on the contour T and on the center line LC—H—Y—41 of the tooth space, the point 41 being in the eccentric circle E. The center of curve M3 is 42. The points 42 and 000 are equidistant from the center line CL of the tooth space and from the point 41. The tooth curves 5 of the seven tooth outer rotors are duplicates of the curves M1 and M3. The spaces between them are wide enough to allow pinion teeth to enter and leave without obstruction. The contours of the sides of the pinion teeth are the same as the contour T, one side in reverse to the other.

Figure XVII shows the type of master generating contour (and convex form of the teeth) preferable for the teeth of the outer rotor, of a size to fit the curves T in Figure XVI.

Figure XVIII shows a pinion ratio circle A1, circroid C2 and generated pinion rotor contour T2 of the type in Figures XIII and XIV, in which the circular tooth space portions are smaller. If still smaller, the convex pinion contour tho not a cycloid L, Fig. XV, is nevertheless nearer to it; the tip of the outer rotor becoming correspondingly weaker.

It will be noted that the nose of the outer rotor tooth only has the master generating form that generates the entire pinion contour. The smaller it becomes the faster it wears.

The pinion tooth form is needed to generate the concave sides of the outer teeth, constituting a system of mutual generation.

When the master curve has a large radius as shown in Figures XV, XVI and XVII, and is used for generation, it wears better and does faster work. Furthermore, the outer rotor tooth spaces become small, do not have to participate in the driving relation, and therefore require no special generation. The only critical curves M4 on a broaching tool may be circular.

The next larger ratio having the desirable hunting relation is the 7 and 9 ratio. The next, the 9 and 11 ratio. These three ratios more than cover the ground of Gerotors now in use having ratios of 4 and 5, 6 and 7, 8 and 9, and 10 and 11; so that the new rotors cut the range of manufacturing equipment down to 75% of that required for the older form. Further, the 5 and 7 tooth ratio supplants both the popular 4 and 5 tooth, and the 6 and 7 tooth ratios now in use; with better displacements and pressure angles, and with greater pressure capacity.

After once discovering or designing the continuous contact curves, it is quite apparent that tolerances in manufacture are contemplated. Variations of the curves, within the limits of substantial fluid tight engagements, all subject substantially to the principle of the "circroidal addition," lie within the scope of our invention.

While we have described a specific application of our invention, it is understood that we are not limited to any specific application, but it embraces, inter alia, the broad method of generating tooth contours for rotors, and or tools therefore, one within or without the other, these contours being based on the circroidal addition and upon a difference of more than one tooth, preferably with a complete hunting relation.

The same ideas relate to spur gears.

What we claim is:

1. The method of generating tooth contours of master and mated toothed gears and or rotors; and or tools to make them with, consisting of selecting arbitrarily a contour for a side of a crown or tooth space of the teeth of the master rotor having one axis, generating the service contours of the mating rotors on another axis with said selected contours centered sufficiently outside of the ratio circle of said master rotor to provide continuous contacts during relative rotation upon their axes, where needed for performance of driving and or fluid pressure functions; by causing relative rotation between a blank for one rotor and a tool representing a contour of the other rotor according to their numbers of teeth, said teeth being arranged around eccentric ratio circles whose radii have a basic fractional ratio differing by one, said basic ratio being the numbers of teeth of said rotors divided by their difference in numbers of teeth and forming generated tooth contours on said blank comprising teeth and tooth spaces, including generating first a tooth and or tooth space thereon, then passing over one or more tooth and or tooth space intervals on said blank, according to the ratio difference, and generating a next tooth and or tooth space on said blank; and continuing this method until all the tooth and or tooth spaces needed are completed.

2. The method of generating tooth contours of master and mated toothed gears and rotors one within the other and having teeth differing in number by two or more, and or tools to make them with, consisting of selecting arbitrarily a contour for both sides of a crown of the tooth member of the master rotor having one axis, forming by generation the service contours of the mating rotors on another axis with said selected contours centered sufficiently outside of the ratio circle of said master rotor to provide continuous contacts during relative rotation upon their axes, where needed for performance of driving and continuous contact functions; and causing a blank for a mated rotor member to rotate with relation to the master member around said two axes at rotor tooth speeds corresponding to their ratio circles, said ratio circles having a difference of one in their basic fractions and generating tooth contours on the mated member, including generating first a tooth and or space thereon, then passing over one or more tooth and or space intervals on said blank, according to the ratio difference, and generating a next tooth and or space on said blank; and continuing this method until all the teeth and or spaces needed are completed.

3. The method of generating tooth contours of master and mated toothed gears and rotors, one within the other and having teeth differing in number by two or more, and or tools to make them with, consisting of selecting arbitrarily a contour for a side of a crown or tooth space for a tool to represent the master rotor; forming by generation a contour on a blank on another axis; said contour being centered sufficiently outside of the ratio circle of said master rotor to provide continuous contacts during relative rotation upon their axes, where needed for performance of driving and or continuous contact functions; by causing relative rotation between a blank for said mated rotor member and said master member at speeds corresponding to their ratio circles, said ratio circles having a difference of one in their basic fractions, the numbers of said fractions being the numbers of said teeth divided by their difference in numbers of teeth and generating tooth contours on the mated member including generating first a tooth and or tooth space thereon, then passing over one or more tooth and or tooth space intervals on said blank, according to the ratio difference and generating a next tooth and or tooth space on said blank, and continuing this method until all the tooth divisions needed are completed.

4. The method of generating tooth contours of master and mated toothed gears and rotors one within the other and having teeth differing in number by two or more, and or tools to make them with, consisting of selecting arbitrarily a contour for a side of a crown or tooth space for a tool to represent the master rotor forming by generation a contour on a blank on another axis said contours being centered sufficiently outside of the ratio circle of said master rotor to provide continuous contacts during relative rotation upon their axes, where needed for performance of driving and or continuous contact functions by causing relative rotation between a blank for said mated rotor member and said master member at speeds corresponding to their ratio circles, said ratio circles having a difference of one in their basic fractions said basic fractions comprising numbers of teeth of said two rotors divided by their difference in numbers of teeth and generating contours on the mated member including generating first a tooth and or tooth space thereon, then passing over one or more tooth and or tooth space intervals on said blank, according to the ratio difference, and generating a next tooth and or tooth space on said blank and continuing this method circularly and axially until all the teeth and or tooth spaces needed are completed.

5. The method of generating tooth contours of master and mated toothed gears and or rotors; and or tools to make them with, consisting of choosing a tooth contour for a master rotor having one axis, generating contours of a mating rotor on another axis with said selected contour centered sufficiently outside of the ratio circle of said master rotor to provide continuous contacts during relative rotation upon their axes, where needed for performance of driving and or continuous contact functions; and causing relative rotation between a blank for a mated rotor and the master member at speeds corresponding to their ratio circles, said ratio circles having a difference of one in basic fractions, said fractions comprising the numbers of teeth of said rotors divided by their difference in numbers of teeth and generating tooth curves including convex and concave contours on the mated member including generating first a tooth and or tooth space thereon, then passing over one or more tooth and or tooth space intervals on said blank, according to the ratio difference, and generating a next tooth and or tooth space on said blank, and continuing this method until all the teeth and or tooth spaces needed are completed.

6. The method of generating continuous contact teeth on an internal gear, rotor or tool member around ratio circles for a difference in numbers of teeth of more than one comprising the location of a forming tool, representing a contour on one of said teeth with a center or centers of curvature of said contour located outside of its ratio circles at a sufficient distance for said continuous contact, and causing it to form on a blank for the other internal member a tooth space, then to skip over the next or intermediate tooth space and form another tooth space beyond, and so on in sequence until all the teeth on said blank have been generated.

7. The method claimed in claim 6 combined with skipping more than one intermediate tooth space between the forming of the first and second and other tooth spaces.

MYRON FRANCIS HILL.
FRANCIS A. HILL, 2ND.

REFERENCES CITED

The following references are of record in the file of this patent:

UNITED STATES PATENTS

| Number | Name | Date |
|---|---|---|
| Re. 21,316 | Hill | Jan. 9, 1940 |
| 134,198 | Eltenborough | Dec. 24, 1872 |
| 1,798,059 | Bilgram et al. | Mar. 24, 1931 |
| 1,833,993 | Hill | Dec. 1, 1931 |
| 1,997,228 | Nichols | Apr. 9, 1935 |
| 2,091,317 | Hill | Aug. 31, 1937 |
| 2,222,515 | Pigott | Nov. 19, 1940 |
| 2,474,393 | Cobb | June 28, 1949 |

FOREIGN PATENTS

| Number | Country | Date |
|---|---|---|
| 822,576 | France | Sept. 27, 1937 |